(12) United States Patent
Bernstein

(10) Patent No.: US 9,064,389 B1
(45) Date of Patent: Jun. 23, 2015

(54) INTELLIGENT SENSOR FOR AN AUTOMATED INSPECTION SYSTEM

(71) Applicant: e-Control Systems, Inc., Sherman Oaks, CA (US)

(72) Inventor: Eran Y. Bernstein, Sherman Oaks, CA (US)

(73) Assignee: E-Control Systems, Inc., Sherman Oaks, CA (US)

( * ) Notice: Subject to any disclaimer, the term of this patent is extended or adjusted under 35 U.S.C. 154(b) by 135 days.

(21) Appl. No.: 14/051,398

(22) Filed: Oct. 10, 2013

Related U.S. Application Data

(60) Provisional application No. 61/725,912, filed on Nov. 13, 2012.

(51) Int. Cl.
| | | |
|---|---|---|
| G08B 1/08 | (2006.01) | |
| G08B 17/06 | (2006.01) | |
| G06F 3/041 | (2006.01) | |
| G08C 17/02 | (2006.01) | |

(52) U.S. Cl.
CPC *G08B 1/08* (2013.01); *G06F 3/041* (2013.01); *G08C 17/02* (2013.01)

(58) Field of Classification Search
CPC ........ G08B 25/10; G08B 19/00; G08B 17/00; G08B 17/06; G08B 21/182; G08B 1/08; F25D 2700/12; F25D 2700/16; F25D 2700/21; F25D 2700/06; G01K 1/024; G01K 1/026
USPC .......... 340/539.16, 539.19, 539.26, 584, 588, 340/870.17, 501, 506, 5.61
See application file for complete search history.

(56) References Cited

U.S. PATENT DOCUMENTS

| | | | |
|---|---|---|---|
| 6,549,135 B2 | 4/2003 | Singh et al. | |
| 7,013,661 B2 | 3/2006 | Gatling et al. | |
| 7,019,638 B1 | 3/2006 | Wallace | |
| 7,075,442 B2 | 7/2006 | Lion et al. | |
| 7,201,099 B2 | 4/2007 | Harris, Jr. et al. | |
| 7,461,973 B2 * | 12/2008 | Jensen | 374/103 |
| 7,846,397 B2 | 12/2010 | Gregg et al. | |
| 8,248,252 B2 | 8/2012 | Schechter et al. | |
| 8,258,943 B2 * | 9/2012 | Park et al. | 340/539.22 |
| 2006/0220887 A1 | 10/2006 | Lion et al. | |
| 2006/0267731 A1 * | 11/2006 | Chen | 340/10.1 |
| 2008/0043809 A1 | 2/2008 | Herbert | |
| 2010/0040191 A1 | 2/2010 | Ubarretxena Belandia et al. | |

\* cited by examiner

*Primary Examiner* — Hung T Nguyen
(74) *Attorney, Agent, or Firm* — Patterson Intellectual Property Law, P.C.; Mark J. Patterson

(57) ABSTRACT

An automatic inspection system includes intelligent sensor monitors. A sensor monitor receives input from at least one sensor. The sensor monitor conserves power and communications link bandwidth by transmitting data to an aggregator or server only when relevant to rules of the inspection system or when prompted by the inspection system for data. The sensor monitor also provides an alarm when the sensed data indicates an alarm condition, and the alarm provided is indicative of the alarm condition.

21 Claims, 2 Drawing Sheets

INTELLIGENT SENSOR FOR AN AUTOMATED INSPECTION SYSTEM

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims priority to and hereby incorporates by reference in its entirety U.S. Provisional Patent Application Ser. No. 61/725,912 entitled "INTELLIGENT SENSOR FOR AN AUTOMATED INSPECTION SYSTEM" filed Nov. 13, 2012.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to systems for automatic storage and/or inspection of perishable and expendable items, such as food, medical supplies, and biological materials. More particularly, this invention pertains to intelligent sensors for use in automated inspection systems.

Conventional automated inspection systems continuously or periodically log data from sensors. That is, the inspection systems acquire data from all sensors or sensor monitors at a predetermined interval, and the sensors may continuously stream data to the inspection system for logging. This causes the inspection system to produce large volumes of data for storage by the system and utilizes communications link bandwidth for data that may not be necessary. Further, the continuous transmission or automatic transmission of data by the sensors increases power consumption by each sensor.

BRIEF SUMMARY OF THE INVENTION

Aspects of the present invention provide an automatic inspection system including intelligent sensor monitors. The sensor monitors and sensors conserve power and communications link bandwidth by transmitting data only when relevant to the inspection system or when prompted by the inspection system for data. The sensor monitors also provide alarms when the sensed data indicates an alarm condition.

In one aspect, a sensor monitor for use with a sensor and for use with a data aggregator coupled to a wireless communications link includes a wireless communications module and a controller. The controller is functionally coupled to the wireless communications module. The controller is operable to receive sensor data from the sensor, sample the received sensor data to generate a plurality of sensor data points, communicate the plurality of sensor data points to the wireless communications module for transmission to the aggregator, compare the plurality of sensor data points to an alarm condition algorithm, activate an alarm condition when the plurality of sensor data points satisfies the alarm condition algorithm, and communicate an alarm to the wireless communications module in response to activating the alarm condition. The wireless communications module is operable to transmit sensor data points received by the wireless communications module from the controller to the aggregator via the wireless communications link and transmit a received alarm to the aggregator via the wireless communications link.

In another aspect, a sensor monitor powered by a battery includes a memory, a wireless communications module, and a controller. The memory is operable to receive power from the battery and store sensor data points provided to the memory. The wireless communications modules operable to receive power from the battery and transmit sensor data points provided to the wireless communications module to an aggregator via a wireless communications link between the wireless communications module and the aggregator. The controller is operable to receive power from the battery, provide a plurality of sensor data points to the memory for storage by the memory, retrieve the stored plurality of sensor data points from the memory at a predetermined interval, and provide the retrieved plurality of sensor data points to the wireless communications module for transmission to the aggregator.

BRIEF DESCRIPTION OF THE SEVERAL VIEWS OF THE DRAWINGS

Reference will now be made in detail to optional embodiments of the invention, examples of which are illustrated in accompanying drawings. Whenever possible, the same reference numbers are used in the drawing and in the description referring to the same or like parts.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims.

Figure 1:
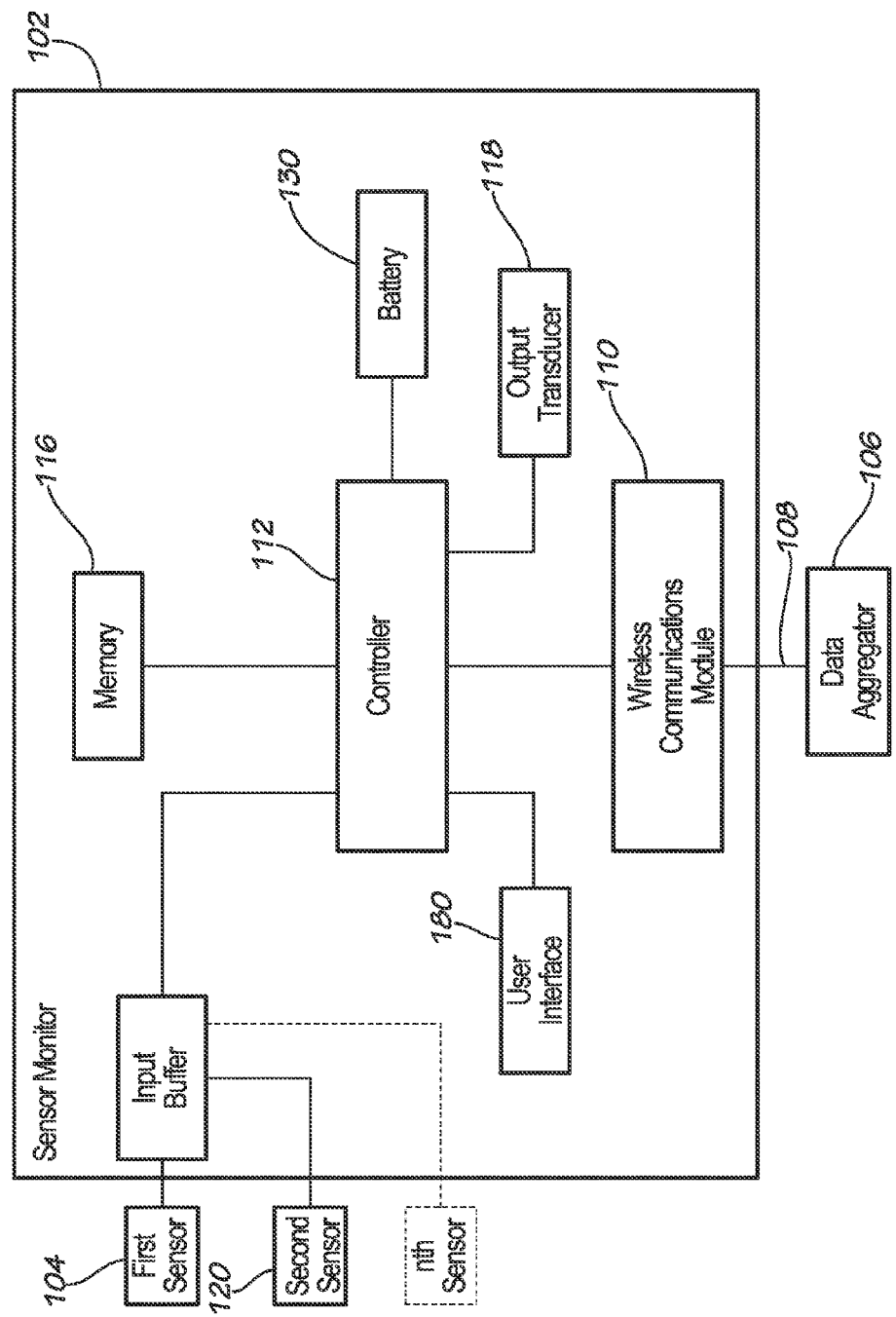
FIG. 1 is a block diagram of a sensor monitor for use with an automated inspection system.
Figure 2:
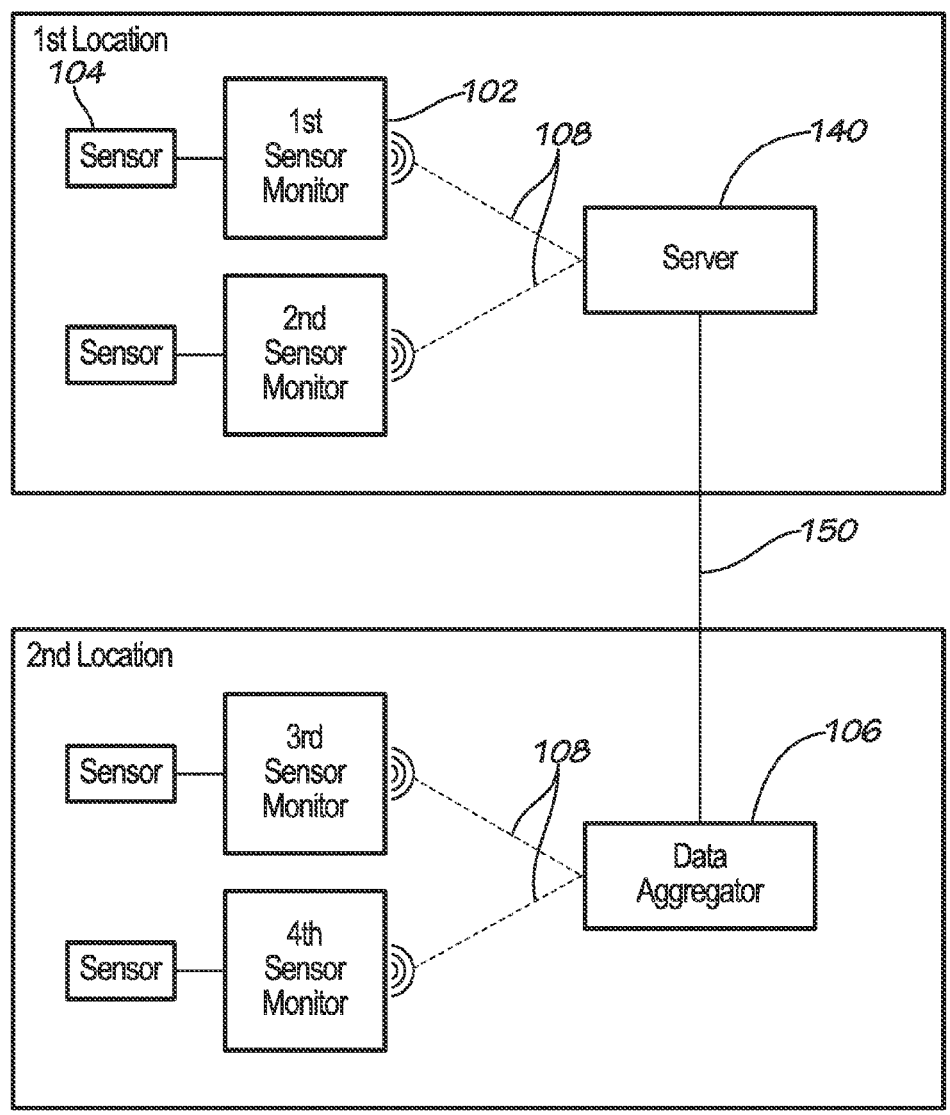
FIG. 2 is a block diagram of an automated inspection system showing various sensor monitor configurations and communications links.

Referring to FIGS. 1 and 2, a sensor monitor 102 for use with a sensor 104 and with a data aggregator 106 coupled to a wireless communications link 108 includes a wireless communications module 110 and a controller 112. The controller 112 is functionally coupled to the wireless communications module 110. The controller 112 is operable to receive sensor data from the sensor 104. In one embodiment, the controller 112 receives the sensor data from the sensor 104 via an input buffer 114. The sensor data is representative of a condition measured by the sensor 104 (e.g., door open/closed, temperature, humidity, light lumen level, motor or compressor on/off, etc.). If the sensor 104 outputs data in an analog format, the input buffer 114 digitizes the analog format data to produce the sensor data and transmits the produced sensor data to the controller 112. If the sensor 104 outputs data in a digital format, the input buffer 114 receives the digital format data from the sensor 104, buffers the received digital data (e.g., signal level adjustments) to produce the sensor data, and provides the produced sensor data to the controller 112. In one embodiment, the sensor 104 and sensor monitor 102 communicate via a communications bus (e.g., a controller area network bus). The input buffer 114 is bi-directional, polling the sensor 104 for data and receiving data in response to the polling. The sensor 104 may also transmit data to the sensor monitor 102 via the communications bus at predetermined intervals without being polled by the sensor monitor 102. In one embodiment, the sensor monitor 102 includes the sensor 104. It is contemplated that the wireless communications module 110 may be separate from or integral with the controller 112.

The controller 112 is further operable to sample the received sensor data to generate a plurality of sensor data points. The controller 112 communicates the plurality of sensor data points to the wireless communications module 110 for transmission to the data aggregator 106. The controller 112 may communicate the plurality of sensor data points to the wireless communications module 110 for transmission to the data aggregator 106 at predetermined intervals, or in response to polling (i.e. the request for data) from the data aggregator 106.

The controller 112 is further operable to compare the plurality of sensor data points to an alarm condition algorithm and activate an alarm condition when the plurality of sensor data points satisfies the alarm condition algorithm. The controller 112 communicates an alarm to the wireless communications module 110 in response to activating the alarm condition. In one embodiment, the controller 112 provides the plurality of sensor data points to the wireless communications module 110 for transmission to the data aggregator 106 in response to determining the alarm.

The wireless communications module 110 is operable to transmit sensor data points received by the wireless communications module 110 to the data aggregator 106. The wireless communications module 110 is further operable to transmit a received alarm to the data aggregator 106 via the wireless communications link 108. In one embodiment, the wireless communications module 110 is further operable to receive an instruction from the data aggregator 106 via the wireless communications link 108. The wireless communications module 110 provides the received instruction to the controller 112, and the controller 112 receives the provided instruction and alters the alarm condition algorithm of the controller 112 in response to receiving instruction. In this way, alarm condition algorithms on various sensor monitors 102 in an automatic inspection system may be updated with new parameters or algorithms from a remote server (e.g., data aggregator 106) managing all of the sensor monitors 102. In one embodiment, the wireless communications module 110 is further operable to receive a sensor data request from the data aggregator 106. The wireless communications module 110 provides the received request to the controller 112, and the controller responds by providing sensor data points to the wireless communications module 110 from the memory 116, or in near real time directly from the sensor 104 (optionally via the input buffer 114).

In one embodiment, the sensor monitor 102 includes a touchscreen interface operable to provide a user access to alarm parameters and algorithms associated with other sensor monitors and sensors. The user can alter the alarm parameters and/or algorithms of those other sensors and sensor monitors via the touchscreen interface. The sensor monitor 102 provides the updated parameters to the server (e.g., data aggregator) which then provides the updated alarm parameters and/or algorithms to those other sensor and sensor monitors. Alternatively, the server (e.g., data aggregator 106) can provide the sensor monitor 102 with the addresses (e.g., IP addresses) of those other sensors and sensor monitors, and the sensor monitor 102 can provided the updated alarm parameters and/or algorithms to those other sensors and sensor monitors directly.

In one embodiment, the sensor monitor 102 further includes a memory 116. The memory is functionally coupled to the controller 112 and is operable to store sensor data points communicated by the controller 112. The controller 112 is further operable to provide a plurality of sensor data points to the memory 116 for storage by the memory 116. In one embodiment, the controller 112 retrieves the stored plurality of sensor data points from the memory 116 at a predetermined interval and provides the retrieved plurality of sensor data points to the wireless communications module 110 for transmission to the data aggregator 106 via the communications link 108. In one embodiment, the memory 116 is integral with the controller 112. In another embodiment, the memory 116 is separate from the controller 112.

In one embodiment, the sensor monitor 102 further includes an output transducer 118 operable to provide an output signal in response to receiving an output from the controller 112. In this embodiment, the controller 112 is further operable to retrieve the stored plurality of sensor data points from the memory 116 at a predetermined interval. In response to determining an alarm, the controller 112 provides an output to the output transducer 118. The output is a function of the determined alarm. In one embodiment, the output transducer is an audio transducer, and the controller 112 provides an audio signal as the output to the audio transducer as a function of the determined alarm. The audio transducer emits an audible signal as a function of the received audio signal. In this embodiment, providing the plurality of sensor data points to the wireless communications module 110 for transmission to the data aggregator 106 includes providing the retrieved plurality of sensor data points to the wireless communications module 110 for transmission to the data aggregator 106. In one embodiment, the output transducer 118 is a visual alarm operable to flash light in response to receiving a light signal. The controller 112 is operable to provide the light signal as the output to the visual alarm in response to determining the alarm, and the light signal is a function of the determined alarm.

In one embodiment, the controller 112 determines an alarm, and in response to determining the alarm, the controller 112 takes an action other than providing an output signal to the output transducer 118. For example, in response to determining an alarm, the controller 112 may increase the data sample rate of the sensor data.

In one embodiment, the sensor monitor 102 further includes a user interface 180. The user interface 180 includes a display operable to display a parameter of the alarm condition algorithm, and a user input device operable to receive user input offering the display parameter. The display and user input device may be separate, for example, an LCD screen and a keypad or integrated, for example, as a touchscreen interface.

In one embodiment, the controller 112 is further operable to receive second sensor data from a second sensor 120. The second sensor may be, for example, a humidity probe when the first sensor 104 is a temperature probe. The controller 112 compares the plurality of sensor data points and the second sensor data to the alarm condition algorithm and determines the alarm when the plurality of sensor data points and the second sensor data satisfy the alarm condition algorithm. For example, the alarm condition algorithm may be related to a temperature and humidity curve (i.e., plot of allowable temperatures at different humidity levels) such that the alarm is determined as a combination of both the sensed temperature and humidity. Alternatively, the alarm condition algorithm may be an independent temperature or humidity limit. As used herein, satisfy intended to mean meets or exceeds the defined condition to trigger the alarm. It is contemplated that the sensor monitor 102 and controller 112 may monitor any number of sensors.

In one embodiment, the sensor monitor 102 is powered by a battery 130. The memory 116, wireless communications module 110, and controller 112 are coupled to receive power from the battery 130. The memory 116 may receive power from the battery 130 via the controller 112. The controller 112 may operate the memory 116 in a reduced power or sleep mode by regulating the power voltage provided to the memory 116. In one embodiment, the controller 112 is further operable to at least partially prevent the wireless communications module 110 from receiving power from the battery 130 when the controller 112 is not providing the retrieved plurality of sensor data points to the wireless communications module 110 for transmission to the data aggregator 106. The controller 112 may further at least partially prevent the wireless communications module 110 receiving power from the battery 130 for a predetermined period of time after providing the retrieved plurality of sensor data points to the wireless communications module 110. This allows the wireless communications module 110 sufficient time to complete transmission of the retrieved plurality of sensor data points to the data aggregator 106 via the communications link 108. In one embodiment, the wireless communications module 110 is further operable to receive an instruction from the data aggregator 106 via the wireless communications link 108, provide the received instruction to the controller 112, and operate in a sleep mode or reduced power mode when not receiving sensor data from the controller 112, receiving an instruction from the data aggregator 106, or transmitting sensor data points received from the controller 112 to the data aggregator 106.

In one embodiment, the data aggregator 106 is a wireless mesh network gateway operably connected to a TCP/IP network 150. That is, the wireless communications link 108 transmits data wirelessly from sensor monitor 102 to the data aggregator 106 which is in a location proximate the sensor monitor 102. The data aggregator 106 then relays the data received from the sensor monitor 102 to a server 140 via the TCP/IP network 150 (e.g., the Internet, a private local network, or a virtual private network). The server 140 is configured to receive and store sensor data points transmitted via the wireless communications link 108 and/or the TCP/IP network 150. The server 140 is further configured to receive input from a user altering the alarm condition algorithm implemented by any sensor monitor 102 associated with the server 140 and to display sensor data to the user. It is contemplated that the server 140 may be, for example, a headless server, a mobile computing device, a tablet computer, a laptop computer, or a desktop computer. In one embodiment, the data aggregator 106 and server 140 are integral. In another embodiment (e.g., see FIG. 2) the data aggregator 106 is remote from the server 140. As used herein, the term wireless communication link is intended to mean a communications link that is at least partially wireless. For example, communications links forming the wireless communications link may include proprietary wireless mesh networks, ZigBee networks, Bluetooth networks, hardwired Ethernet networks, cellular networks, WiFi (e.g., IEEE 802.11a/b/g/n) and other wired and wireless networks.

It will be understood by those of skill in the art that navigating between user interface views is accomplished by selecting a tab or object in a current user interface view corresponding to another user interface view, and in response to selecting the tab or object, the user interface updates with said another user interface view corresponding to the selected tab or object.

It will be understood by those of skill in the art that providing data to the system or the user interface may be accomplished by clicking (via a mouse or touchpad) on a particular object or area of an object displayed by the user interface, or by touching the displayed object in the case of a touchscreen implementation.

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although embodiments of the present invention have been described in detail, it will be understood by those skilled in the art that various modifications can be made therein without departing from the spirit and scope of the invention as set forth in the appended claims.

A controller, processor, computing device, client computing device or computer, such as described herein, includes at least one or more processors or processing units and a system memory. The controller may also include at least some form of computer readable media. By way of example and not limitation, computer readable media may include computer storage media and communication media. Computer readable storage media may include volatile and nonvolatile, removable and non-removable media implemented in any method or technology that enables storage of information, such as computer readable instructions, data structures, program modules, or other data. Communication media may embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

Thus, although there have been described particular embodiments of the present invention of a new and useful INTELLIGENT SENSOR FOR AN AUTOMATED INSPECTION SYSTEM it is not intended that such references be construed as limitations upon the scope of this invention except as set forth in the following claims.

What is claimed is:

1. A sensor monitor for use with a sensor and for use with a data aggregator coupled to a wireless communications link, the sensor monitor comprising:
   a wireless communications module;
   a controller functionally coupled to the wireless communications module, the controller operable to:
      receive sensor data from the sensor,
      sample the received sensor data to generate a plurality of sensor data points,
      communicate the plurality of sensor data points to the wireless communications module for transmission to the data aggregator,
      compare the plurality of sensor data points to an alarm condition algorithm,
      activate an alarm condition when the plurality of sensor data points satisfies the alarm condition algorithm; and wherein
   the wireless communications module is operable to
      transmit sensor data points received by the wireless communications module to the data aggregator via the wireless communications link, and
      transmit a received alarm to the data aggregator via the wireless communications link.

2. The sensor monitor of claim 1, further comprising:
   a memory functionally coupled to the controller and operable to store sensor data points communicated by the controller;
   an output transducer operable to emit an output signal in response to receiving an output;
   the controller is further operable to:
      communicate an alarm to the wireless communications module in response to activating the alarm condition;
      retrieve the stored plurality of sensor data points from the memory at a predetermined interval, and
      provide the output to the output transducer in response to determining the alarm, wherein the output is a function of the determined alarm; and
   wherein providing the plurality of sensor data points to the wireless communications module for transmission to the data aggregator comprises providing the retrieved plurality of sensor data points to the wireless communications module for transmission to the data aggregator.

3. The sensor monitor of claim 1, wherein the controller provides the plurality of sensor data points to the wireless communications module for transmission to the data aggregator in response to determining the alarm.

4. The sensor monitor of claim 1, wherein:
   the wireless communications module is further operable to
      receive an instruction from the data aggregator via the wireless communications link, and
      provide the received instruction to the controller; and
   the controller is further operable to
      receive the provided instruction, and
      alter the alarm condition algorithm of the controller in response to the received instruction.

5. The sensor monitor of claim 1, wherein the controller is further operable to:
   receive second sensor data from a second sensor;
   compare the plurality of sensor data points and the second sensor data to the alarm condition algorithm; and
   determine the alarm when the plurality of sensor data points and the second sensor data satisfy the alarm condition algorithm.

6. A sensor monitor powered by a battery comprising:
   a memory operable to
      receive power from the battery, and
      store sensor data points provided to the memory;
   a wireless communications module operable to
      receive power from the battery, and
      transmit sensor data points provided to the wireless communications module to a data aggregator via a wireless communications link between the wireless communications module and the data aggregator; and
   a controller operable to
      receive power from the battery;
      provide a plurality of sensor data points to the memory for storage by the memory,
      retrieve the stored plurality of sensor data points from the memory at a predetermined interval, and
      provide the retrieved plurality of sensor data points to the wireless communications module for transmission to the data aggregator.

7. The sensor monitor of claim 6, wherein:
the controller is further operable to
  receive sensor data from a sensor,
  sample the received sensor data to generate the plurality of sensor data points,
  compare the plurality of sensor data points to an alarm condition algorithm,
  determine an alarm when the plurality of sensor data points satisfies the alarm condition algorithm, and
  provide the determined alarm to the wireless communications module in response to determining the alarm; and
the wireless communications module is further operable to
  receive the determined alarm from the controller, and
  transmit the determined alarm to the data aggregator via the wireless communications link.

8. The sensor monitor of claim 6, wherein the memory is integral with the controller.

9. The sensor monitor of claim 6, wherein the memory receives power from the battery via the controller.

10. The sensor monitor of claim 6, wherein the controller is further operable to at least partially prevent the wireless communications module from receiving power from the battery when the controller is not providing the retrieved plurality of sensor data points to the wireless communications module for transmission to the data aggregator and for a predetermined period of time after providing the retrieved plurality of sensor data points to the wireless communications module.

11. The sensor monitor of claim 6, wherein the wireless communications module is operable to:
  receive an instruction from the data aggregator via the wireless communications link;
  provide the received instruction to the controller; and
  operate in a sleep mode when not receiving sensor data from the controller, receiving an instruction from the data aggregator, or transmitting sensor data points received from the controller to the data aggregator.

12. The sensor monitor of claim 6, wherein the controller is further operable to:
  receive sensor data from a sensor; and
  sample the received sensor data to generate the plurality of sensor data points, and wherein the sensor monitor further comprises the sensor, wherein the sensor is operable to provide sensor data representative of a condition measured by the sensor.

13. The sensor monitor of claim 6, wherein:
the controller is further operable to
  receive first sensor data from a first sensor,
  receive second sensor data from a second sensor,
  sample the received first sensor data to generate the plurality of sensor data points,
  compare the plurality of sensor data points and the second sensor data to an alarm condition algorithm,
  determine an alarm when the plurality of sensor data points and the second sensor data satisfy the alarm condition algorithm, and
  provide the determined alarm to the wireless communications module in response to determining the alarm; and
the wireless communications module is further operable to:
  receive the determined alarm from the controller; and
  transmit the determined alarm to the data aggregator via the wireless communications link.

14. The sensor monitor of claim 6, wherein:
the controller is further operable to
  receive first sensor data from a first sensor,
  receive second sensor data from a second sensor,
  sample the received first sensor data and the received second sensor data to generate the plurality of sensor data points,
  compare the plurality of sensor data points to an alarm condition algorithm,
  determine an alarm when the plurality of sensor data points and the second sensor data satisfy the alarm condition algorithm, and
  provide the determined alarm to the wireless communications module in response to determining the alarm; and
the wireless communications module is further operable to
  receive the determined alarm from the controller, and
  transmit the determined alarm to the data aggregator via the wireless communications link.

15. The sensor monitor of claim 6, wherein:
the wireless communications module is further operable to
  receive an instruction from the data aggregator via the wireless communications link, and
  provide the received instruction to the controller; and
the controller is further operable to
  receive the provided instruction, and
  alter an alarm condition algorithm of the controller as a function of the received instruction.

16. The sensor monitor of claim 6, wherein:
the data aggregator is a wireless mesh network gateway operably connected to a TCP/IP network;
the TCP/IP network is operably connected to a server; and
the server is operable to receive and store sensor data points transmitted by the wireless communications module to the server via the wireless communications link.

17. The sensor monitor of claim 6, wherein the data aggregator is a server operable to receive and store sensor data points transmitted by the wireless communications module to the server via the wireless communications link.

18. The sensor monitor of claim 6, further comprising:
an audio transducer operable to emit an audible signal in response to receiving an audio signal; and
a visual alarm operable to flash light in response to receiving a light signal; wherein
the controller is further operable to:
  receive sensor data from a sensor;
  sample the received sensor data to generate the plurality of sensor data points;
  compare the plurality of sensor data points to an alarm condition algorithm;
  determine an alarm when the plurality of sensor data points satisfies the alarm condition algorithm;
  provide the audio signal to the audio transducer in response to determining the alarm, wherein the audio signal is a function of the determined alarm; and
  provide the light signal to the visual alarm in response to determining the alarm, wherein the light signal is a function of the determined alarm.

19. The sensor monitor of claim 6, further comprising a battery, wherein the battery is operable to provide power to the memory, the controller, and the wireless communications module.

20. The sensor monitor of claim 6, further comprising:

a display operable to display a parameter of an alarm condition algorithm; and a user input device operable to receive user input altering the displayed parameter, wherein the display and user input device form a touchscreen user interface of the sensor monitor.

21. The sensor monitor of claim 20 wherein:

the sensor monitor is functionally coupled to a plurality of other sensor monitors and sensors;

the touchscreen user interface is operable to provide a user access to alarm parameters and alarm algorithms associated with the other sensor monitors and sensors;

the touchscreen user interface is effective to allow a user to alter the alarm parameters and alarm algorithms associated with the other sensors and sensor monitors.

\* \* \* \* \*